United States Patent Office 3,516,966
Patented June 23, 1970

3,516,966
POLYKETONE COPOLYMERS
Charles E. Berr, Wilmington, Del., assignor to E. I. du Pont de Nemours and Company, Wilmington, Del., a corporation of Delaware
No Drawing. Filed Feb. 5, 1968, Ser. No. 702,802
Int. Cl. C08g *33/10*
U.S. Cl. 260—47                                          4 Claims

ABSTRACT OF THE DISCLOSURE

Copolyketone of substantially equimolar amounts of (a) diphenyl ether and (b) mixed benzene dicarboxylic acid halides or acids, the "b" component comprising 70 to 95 mol percent terephthaloyl halide (T) and 5 to 30 mol percent isophthaloyl halide (I) or the corresponding acids, the copolymers being useful for electrical insulation at high temperature.

RELATED ART

Polyketone and copolyketone polymers have been described in the literature. Among the patents of interest are: British Pat. Nos. 971,227 (9/30/64), 1,060,611 (3/8/67), and 1,086,021 (10/4/67); Holland 6,611,019; Belgium 689,509; and U.S. Pat. 3,065,205.

STATEMENT OF THE INVENTION

In accordance with the present invention, there is provided a high molecular weight, melt-stable, crystalline copolyketone consisting essentially of the recurring structural unit

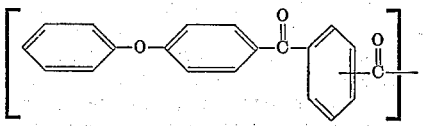

wherein 70 to 95 percent of the

moieties are

and 5 to 30 percent are

and the number of recurring units present is sufficiently large to provide a copolymer having an inherent viscosity of at least 0.4, measured as a 0.5 percent by weight solution in concentrated sulfuric acid at 23° C. A preferred group of these copolymers are those wherein 75 to 90 percent of the

moieties are

and 10 to 25 percent are

The copolymers of this invention are prepared from equimolar, or substantially equimolar amounts of diphenyl ether and a mixture of benzene dicarboxylic acid halides, comprising 70 to 95 mol percent terephthaloyl halide and 5 to 30 mol percent isophthaloyl halide, or the corresponding acids. The process conditions involve various modifications of Friedel-Crafts conditions for acylation reactions. While acid chlorides are preferred, other isophthalic and terephthalic acid halides, as well as the free acids, are also operable. Common Friedel-Crafts catalysts can be employed including aluminum chloride, aluminum bromide, boron trifluoride, hydrogen fluoride, ferric chloride, stannic chloride, titanium tetrachloride, etc., and mixtures thereof. Aluminum chloride and mixtures of hydrogen fluoride and boron trifluoride are preferred.

The amount of catalyst used can vary over a fairly wide range, and ordinarily will provide at least a molar equivalent of catalyst, e.g. boron fluoride, per carbonyl group in the monomeric reactants. The amount of hydrogen fluoride used with the preferred boron fluoride will provide an excess of HF based on the amount of boron fluoride used, and preferably about 2 to about 10 or more moles of hydrogen fluoride will be used for each mole of boron fluoride.

The polymerization reaction can be carried out from as low as only a few degrees above the freezing temperatures of the reactants to as high as 100° or 150° C. The duration of the reaction can be as low as 15 or 20 minutes and as high as 10 or 20 hours or more, and can conveniently be carried out at autogenous pressure, but pressures in excess thereof are not considered detrimental. If a metal halide is employed as a catalyst, the reaction is carried out in typical reaction media for this type of reaction, such as nitrobenzene, carbon disulfide, a chlorinated hydrocarbon such as tetrachloroethane, and so forth.

The copolymers of this invention are useful in a variety of applications. At viscosities above about 0.4, the copolymers are tough and can be used in the form of shaped articles which can be formed from the melt phase by extrusion or other convenient means. Such shaped articles include films, filaments, and the like. Because the very high molecular weight copolymers become difficult to extrude, copolymers having an inherent viscosity of 0.5 to 1.5 are preferred and those in the range of 0.7 to 1.2 are highly preferred.

The copolymers are outstanding in properties such as chemical resistance, solvent resistance, thermal stability, hydrolytic stability, oxidation resistance, and electrical insulating properties. In film form they exhibit very good toughness, flex life, clarity, heat sealability, tensile strength, elongation, modulus, etc. They are useful as electrical insulation, and of primary importance is the fact that they retain their good insulating properties at elevated temperatures. They are also useful as a coating on less tractable polymeric materials such as polyimides, polybenzimidazoles, polybenzoxazoles, etc., in various shapes such as film, in which combinations the copolyketones of this invention serve as heat-sealable coating. They can also be applied as coatings to other types of substrates such as metals including aluminum, copper, nickel, silver, etc. By way of example, the DPE–T/I (80:20) polymer can be considered. This is an especially preferred composition, and it can be formed by heat or by heat and pressure, and is self-extinguishing. Film of this polymer can be sealed on a hot-wire sealer, and remains flexible without cracking or crazing at liquid nitrogen temperature (−196° C.). The polymer bonds well to various metals such as (1) mild steel, (2) stainless steel, (3) copper which has an oxidized surface, and (4) aluminum which has been treated with sodium phosphate, optionally followed by treatment with nitric acid. Strong bonds to metals are prepared by hot press lamination at 400–425° C. Some exemplary results are as follows: Bonds to stainless steel: Peel strength (film pulled perpendicularly from metal on Suter tester) greater than 50 lbs./in.; Shear strength greater than 200 lbs./in.; Thermal stability: no observable change after 300 hours aging in air at 260° C. and 5 lbs./in. load. Bonds to treated aluminum: Peel strength (measured as above) 25 to 50 lbs./in.; Shear strength greater than 200 lbs./in. Bonds to oxidized copper: Peel strength (measured as above) 30 to 40 lbs./in.; Hydrolytic stability: no observable change after more than 70 hours immersion in boiling water.

The copolymers of this invention are crystalline, and more importantly, regain their crystallinity after extrusion. DPE–T/I copolymers having T:I ratios below 70:30 crystallize only with difficulty. The copolyketones of this invention upon melting and solidifying recover their crystalline state. This property is of significance since several important performance properties of the polymers depend on their being crystalline. These copolymers have good dielectric constants, low dissipation factors, and surprisingly good electrical properties above the glass transition temperature, which temperature is fairly constant throughout the whole range defined. It is about 159–166° C., varying slightly with the T:I ratio and the method of measurement. Two standard methods, use of differential thermal analysis (DTA) equipment with a calorimetric attachment (such as the Du Pont Model 900 DTA instrument) or a differential scanning calorimeter (such as the Perkin-Elmer instrument), and use of a penetrometer, were employed in this work. The copolymers of this invention exhibit crystalline melting points of about 330° to 380° C. and extrusion temperatures of about 370° to 410° C.

Representative values showing the good electrical properties for an unoriented copolymer film of the preferred composition within the scope of the invention are:

TABLE I

[Dielectric properties of DPE–T/I (80=20) film (1.0 mil film cast from 1,1,1,3,3,3-hexafluoropropanol-2 solution; measurements made with 0.5 in. diam. electrode]

| Frequency, cycles/sec... | Dielectric constant | | Dissipation factor | |
|---|---|---|---|---|
| | $10^2$ | $10^5$ | $10^2$ | $10^5$ |
| Temperature: | | | | |
| 23° C | 5.1 | 5.0 | 0.005 | 0.007 |
| 105° C | 5.0 | 4.9 | 0.004 | 0.004 |
| 155° C | 5.0 | 4.9 | 0.004 | 0.005 |
| 180° C | 5.0 | 4.9 | 0.009 | 0.006 |

The copolymers of this invention possess good resistance to dissolution by many of the more commonly used organic solvents, such as aliphatic alcohols and ketones, and chlorinated biphenyls ("Aroclors" manufactured by Monsanto) used as dielectric fluids in the electrical industry. They even resist attack by boiling N,N-dimethylacetamide (DMAC; boiling point 166° C.), an excellent solvent for aromatic compounds and many polymers. It has been found that DPE–T/I copolymers having T:I ratios of 90:10, 80:20, and 70:30 were all insoluble in boiling DMAC, while those with a ratio of 60:40 and lower were partly soluble (all polymer samples used in this solubility study had inherent viscosities in the range of 0.6–1.0). Conversely, solubility can at times be beneficial, as in the case of solvent casting of shaped articles such as film and fiber, and in preparation of lacquers to be used in application of coatings. Thus, it has been found that while DPE–T is insoluble in dichloroacetic acid, the copolymers with T:I ratios of 90:10, 80:20, and 70:30 are all soluble in dichloroacetic acid.

The copolymers of this invention, having a T:I ratio of 70:30 or higher, retain a significantly higher level of certain mechanical properties when heated to high temperature, than do the copolymers having a lower T:I ratio, as is shown in Table II. While copolymers both above and below a T:I ratio of 70:30 are comparable at 25° C. in modulus and tensile strength values, note that at 200° C. the moduli for polymers at 60:40 and lower ratios are not even 1% of the value at 25° C. and are less than 1000 p.s.i., while those for the 70:30 and higher ratios are very much greater both in absolute value and percentagewise. Furthermore, the tensile strengths of 60:40 and lower copolymers at 200° C. drop below 1000 p.s.i., while those of 70:30 and higher copolymers maintain higher tensile strengths.

It is well known that the different types of chemical linkages possess different thermal stabilities, and that decomposition of compounds or polymers occurs at these inherently defined temperatures. Polymers of the instant type made up of aromatic rings joined by oxygen atoms and carbonyl groups, appear to be stable up to temperatures of about 400° C. or slightly higher, but thermally decompose at temperatures in excess of 400° C. Although DPE–T possesses otherwise desirable characteristics for high-quality electrical insulation, as a practical matter it is found that this polymer cannot be melt fabricated because its high crystalline melting point is reflected in extrusion temperatures of 420° C. or higher. At these extrusion temperatures, polymer degradation and decomposition is sufficiently rapid that the physical properties of the polymer are markedly adversely affected, and clean, uninterrupted extrusion cannot be maintained for even a matter of minutes. Furthermore, other severe problems are encountered on attempting to extrude polymers at these temperatures. The problems include such matters as excessive wear and corrosion of conventional plastics extrusion equipment at these high temperatures, and inability to extrude a sheet or film having acceptable thickness uniformity because of excessive warping of the equipment at these high temperatures. I have now found that by replacing 5–10% or more of the T units with I units, the crystalline melting points and extrusion temperatures of the copolymers are sufficiently lower that the polymers can be melt processed at temperatures where extensive decomposition is avoided.

TABLE II.—MECHANICAL PROPERTIES OF DPE–T/I FILM

| T:I ratio | Inherent viscosity | Thickness, mils | Modulus, k.p.s.i. | | Tensile strength, k.p.s.i. | | Remarks |
|---|---|---|---|---|---|---|---|
| | | | 25° | 200° | 25° | 200° | |
| 100/0 | 0.5 | 3.6 | 270 | 24 | 6.6 | 1.6 | Cast from HF; annealed (1.5 min./380° C.). |
| | 1.2 | 1.0 | 318 | 27 | 8.9 | 1.8 | Cast from HF; annealed (1.5 min./380° C.). |
| 80/20 | 0.4 | 5.1 | 285 | 20 | 10.0 | 4.1 | Cast from HF; annealed (1.5 min./380° C.). |
| | 0.8 | 0.5 | 335 | 46 | 11.6 | 2.6 | Cast from sym-dichloro-tetrafluoroacetone hydrate; not annealed. |
| 70/30 | 1.1 | 0.4 | 340 | 12 | 12.1 | 1.5 | Cast from sym-dichloro-tetrafluoroacetone hydrate; not annealed. |
| 60/40 | 0.7 | 4.8 | 240 | 0.7 | 7.4 | 0.9 | Cast from HF; annealed (1.5 min./380° C.). |
| 50/50 | 0.5 | 4.6 | 320 | 0.5 | 9.1 | 0.8 | Cast from HF; annealed (1.5 min./380° C.). |

The mechanical properties of Table II, the electrical properties of Table I and the inherent viscosities all are measured in accordance with standard tests.

The invention will be described further in conjunction with the following specific examples. Parts and percentages given are by weight, unless otherwise stated or apparent. By following the procedures of the examples, it has been found that the resulting copolymers are sufficiently free of detrimental impurities to be melt processable.

EXAMPLE I

A 150-ml. jacketed Hastelloy-C pressure vessel was charged with 8.595 gms. (0.0505 mol) of diphenyl ether, 5.810 gms. (0.0350 mol) of terephthalic acid and 3.045 gms. (0.0150 mol) of isophthaloyl chloride and the vessel was closed. It was then chilled to about −50° C. by cooling in a solid carbon dioxide/acetone bath. By means of stainless steel tubing attached to a valve on the vessel, there were introduced 50 gms. (2.5 mols) of hydrogen fluoride and 40 gms. (0.6 mol) of boron trifluoride from supply cylinders (the amounts being determined by weight difference). In a barricaded area, the vessel was mounted on a rocker table and flexible conduit from a temperature bath was attached to the jacket of the vessel for temperature control. By rocking the vessel, the reaction system was agitated at 0° C. for 0.5 hour, at 30° C. for 1 hour, and finally at 80° C. for 2 hours. The tube was again cooled to 0° C., and the valve opened to permit venting of boron trifluoride. Nitrogen was then introduced into the vessel to a pressure of 100 p.s.i., and the valve was fitted with a fine orifice. The vessel was placed in an inverted position and the contents were sprayed through the orifice into a 1:1 mixture (volume ratio) of pyridine and methanol stirred with a high-shear stirrer. A fine yellow precipitate formed immediately, and was held in the pyridine/methanol mixture overnight. The precipitated polymer was collected by filtration and extracted with pyridine for 48 hours in a Soxhlet extractor. The polymer was washed with methanol and dried under vacuum at 150° C. The polymer had an inherent viscosity of 0.62, measured on a 0.5% by weight solution in concentrated sulfuric acid at 23° C. The polymer was fabricated into transparent film by pressing at 325° C. under 10,000 p.s.i. for one minute. The resulting somewhat brittle film was made tough by annealing in a furnace at approximately 325° C. for 3 minutes.

EXAMPLE II 500-ml. pressure vessel fabricated of Type 316 stainless steel was fitted with a specially constructed liner of polytetrafluoroethylene. The liner was fitted with (1) a polytetrafluoroethylene screw cap to permit charging of solid and liquid reactants, and (2) a small hole whose purpose will be explained below. The liner was then charged with 5.15 gms. (0.0303 mol) of diphenyl ether, 4.87 gms. (0.0240 mol) of terephthaloyl chloride and 1.22 gms. (0.0060 mol) of isophthaloyl chloride, and the liner was closed. The liner was cooled to about 10° C. in an ice bath, and was then opened and charged with 25 gms. (1.25 mols) of hydrogen fluoride which had been freshly distilled in polytetrafluoroethylene equipment. The liner was placed in the steel pressure vessel in such a position that the hole in the liner remained above the liquid level of the reactants in the liner through this and all succeeding operations. The vessel was then cooled to about −50° C. in a solid carbon dioxide/acetone bath. The vessel was charged as in Example I with 25 gms. (0.37 mol) of boron trifluoride. Succeeding operations were carried out as in Example I: The hole in the polytetrafluoroethylene vessel liner was for the purpose of permitting the boron trifluoride access to the remaining reactants; it also permitted maintenance of equal pressure on both sides of the liner so that it would not deform during the heating cycle. The vessel was maintained at 0° C. for 0.5 hour, then heated to 50° C. for 0.5 hour and to 75° C. for 3.5 hours. After the vessel was cooled and boron trifluoride vented, it was opened and the remaining viscous solution was poured into 125 ml. of distilled hydrogen fluoride. This solution was poured in a fine stream into a stirred mixture of 3 liters of pyridine and 1 liter of methanol. The fine white precipitate which was obtained was collected by filtration and extracted with pyridine in a Soxhlet extractor. The polymer was washed with hot methanol and dried under vacuum. It has an inherent viscosity of 0.49, measured on a 0.5% by weight solution in concentrated sulfuric acid at 23° C.

In an essential re-run of this example (except for carrying out the reaction directly in a 150-ml. stainless steel pressure vessel) a polymer (fine yellow powder) having an inherent viscosity of 1.10 (0.5 wt. percent solution, $H_2SO_4$, 23° C.) was produced.

EXAMPLE III

A polytetrafluoroethylene liner having a capacity of 500 ml. and constructed like that described in Example II was made for a stainless steel pressure vessel having a capacity of 1 liter. The liner was charged with 25.79 gms. (0.1515 mol) of diphenyl ether, 19.92 gms. (0.120 mol) of terephthalic acid, 6.09 gms. (0.030 mol) of isophthaloyl chloride, and 200 gms. (10.0 mols) of distilled hydrogen fluoride. Following a procedure like that of Example II, the vessel was subsequently charged with 80 gms. (1.18 mols) of boron trifluoride. The vessel was held at 0° C. for 1 hour, then heated at 25° C. for 18 hours and at 70° C. for 2 hours. The polymer was isolated as in Example II using 2:1 mixture of methanol and pyridine. The product was purified by treating with pyridine in a Soxhlet extractor. The white polymer obtained had an inherent viscosity of 1.68, measured on a 0.5% by weight solution in concentrated sulfuric acid at 23° C.

EXAMPLE IV

The equipment and procedure described in Example III were used. The vessel was charged with 25.5 gms. (0.150 mol) of diphenyl ether, 24.2 gms. (0.1215 mol) of terephthaloyl chloride, 6.10 gms. (0.030 mol) of isophthaloyl chloride, 125 gms. (6.25 mols) of distilled hydrogen fluoride, and 75 gms. (1.1 mols) of boron trifluoride. The vessel was held at 0° C. for 0.5 hour, then heated at 50° C. for 0.5 hour and at 75° C. for 3.5 hours. After cooling and venting the vessel, the product which remained was diluted with 500 ml. of distilled hydrogen fluoride. This was poured into a stirred mixture of 2 gallons of pyridine and 1 gallon of methanol. The white precipitate which was obtained was washed with pyridine and then with warm methanol. The polymer was dried and was found to have an inherent viscosity of 0.54, measured on a 0.5% by weight solution in concentrated sulfuric acid at 23° C.

EXAMPLE V

Employing the same general procedure as described in Example I, a 150-ml. stainless steel pressure vessel was charged with 8.5 gms. (0.050 mol) of diphenyl ether, 9.135 gms. (0.045 mol) of terephthaloyl chloride, 1.015 gms. (0.005 mol) of isophthaloyl chloride, 40 gms. (2.0 mols) of hydrogen fluoride, and 20 gms. (0.3 mol) of boron trifluoride. While rocking the vessel, it was held at −20° C. for 1 hour, then warmed to 50° C. for 4 hours. The vessel was then cooled to 0° C., and vented to permit boron trifluoride to escape. The residual material was discharged into cold, vigorously stirred methanol. The solid polymer which precipitated was collected by filtration, washed 3 times with methanol, and stored under pyridine overnight. It was then extracted with boiling pyridine in a Soxhlet extractor for two hours. It was extracted 3 times with methanol, 3 times with anhydrous ether, then dried at 60° C. under vacuum at 40 mm. pressure. The polymer had an inherent viscosity of 0.62, measured on a 0.5% by weight solution in concentrated sulfuric acid at 30° C.

Part of the polymeric product was dissolved in concentrated sulfuric acid and reprecipitated by pouring into a 50:50 mixture of methanol and ice. The white polymer which precipitated was washed with water until the filtrate was neutral, was washed with methanol 3 times and with anhydrous ether 3 times, and was dried at 50° C. under vacuum at 40 mm. pressure and then at 220° C. for 2 hours under 1 mm. pressure. The polymer thus purified had an inherent viscosity of 0.84, determined as above indicated. This polymer was molded at 380° C. into tough film 5 mils thick. This film had a crystalline melting point of 371° C., and a glass transition temperature of 161° C. measured by differential thermal analysis and 159–161° C. measured on a penetrometer.

EXAMPLE VI

The general procedure of Example V was repeated to prepare an 80:20 copolymer. For this purpose there were employed 8.4341 grams (0.0496 mol) of diphenyl ether, 8.5073 grams (0.0397 mol) of terephthaloyl chloride and 2.0143 grams (0.0099 mol) of isophthaloyl chloride. After purification of the polymeric product by reprecipitation from sulfuric acid as described in Example V, the copolyketone had an inherent viscosity of 0.75, measured on a 0.5% by weight solution in concentrated sulfuric acid at 30° C. The polymer was pressed at 370° C. into tough creasable film. This film exhibited a crystalline melting point of 350–351° C., and a glass transition temperature of 158–159° C. measured by differential thermal analysis and of 155–160° C. measured on a penetrometer.

EXAMPLE VII

To a stirred suspension of 40 grams (0.3 mol) of aluminum chloride in 75 ml. of sym-tetrachloroethane at room temperature was added a solution of 16.2 grams (0.08 mol) of terephthaloyl chloride, 4.1 grams (0.02 mol) of isophthaloyl chloride and 17.1 grams (0.1 mol) of diphenyl ether in 75 ml. of sym-tetrachloroethane, over a period of 8 minutes. Toward the end of the addition, evolution of hydrogen chloride was evident. After stirring for another 7 minutes at ambient temperature, the flask was heated in an oil bath at 130° C. for 30 minutes. The reaction mixture became red-brown in color and further evolution of hydrogen chloride was observed. The oil bath was removed and the flask was cooled in ice; simultaneously a slush of 200 grams of cold N,N-dimethylacetamide was added to quench the reaction. The reaction mixture was permitted to stand thus overnight, during which time the ice-bath around the flask melted. The solid which had precipitated was collected by filtration, and washed consecutively with acetone, water, and 10% aqueous hydrochloric acid. The solid polymer was dissolved in concentrated sulfuric acid, reprecipitated in water, collected by filtration, washed with water, and dried. The polymer had an inherent viscosity of 0.85, measured on a 0.5% by weight solution in concentrated sulfuric acid at 30° C.

While the invention has been described with certain detail, it will be appreciated that changes therefrom can be made without departing from its scope.

What is claimed is:

1. A film and fiber forming copolyketone polymer consisting essentially of the recurring structural unit

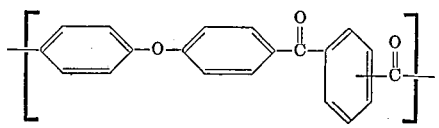

wherein 70 to 95 mol percent of

moieties are

and 5 to 30 mol percent are

said copolymer having an inherent viscosity of at least 0.4 measured as a 0.5 percent by weight solution in concentrated sulfuric acid at 23° C.

2. A copolyketone polymer according to claim 1 in the form of a film or fiber.

3. The copolyketone of claim 1 wherein the

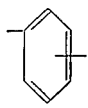

moiety consists of 80 mol percent of

and 20 mol percent of

4. The copolyketone of claim 1 wherein the

moiety consists of 70 mol percent of

and 30 mol percent of

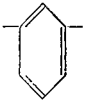

References Cited

UNITED STATES PATENTS 3,065,205 11/1962 Bonner _____ 260—63
3,324,199 6/1967 Tocker _____ 260—857
3,385,825 5/1968 Goodman et al. _____ 260—61

FOREIGN PATENTS 971,227 9/1964 Great Britain.

HAROLD D. ANDERSON, Primary Examiner
L. L. LEE, Assistant Examiner

U.S. Cl. X.R.

117—132, 161; 260—308, 312